United States Patent
Xu et al.

(10) Patent No.: US 8,249,201 B2
(45) Date of Patent: Aug. 21, 2012

(54) METHODS AND SYSTEMS FOR MIMO PREAMBLE DETECTION

(75) Inventors: Mingguang Xu, Evanston, IL (US);
Miguel Griot, Huntington, CA (US);
Pranav Dayal, San Diego, CA (US);
Ayman Fawzy Naguib, Cupertino, CA (US)

(73) Assignee: QUALCOMM Incorporated

( * ) Notice: Subject to any disclaimer, the term of this patent is extended or adjusted under 35 U.S.C. 154(b) by 824 days.

(21) Appl. No.: 12/363,727

(22) Filed: Jan. 31, 2009

(65) Prior Publication Data

US 2010/0091915 A1 Apr. 15, 2010

Related U.S. Application Data

(60) Provisional application No. 61/105,000, filed on Oct. 13, 2008.

(51) Int. Cl.
*H03D 1/00* (2006.01)
(52) U.S. Cl. ........ 375/343; 375/142; 375/144; 375/145; 375/150; 375/148; 375/349; 375/347; 455/500; 455/134; 455/135; 455/226.1; 455/226.4
(58) Field of Classification Search .................. 375/142, 375/144, 145, 150, 148, 343, 349, 347; 455/500, 455/134, 135, 226.1–226.4
See application file for complete search history.

(56) References Cited

U.S. PATENT DOCUMENTS

| | | | | |
|---|---|---|---|---|
| 7,778,151 B2* | 8/2010 | Bertrand et al. | ............. | 370/208 |
| 7,991,084 B2* | 8/2011 | Hooli et al. | ................... | 375/343 |
| 8,059,765 B2* | 11/2011 | Tormalehto | ................... | 375/343 |
| 2005/0271000 A1* | 12/2005 | Schulist | ........................ | 370/328 |
| 2007/0230600 A1* | 10/2007 | Bertrand et al. | ............. | 375/260 |
| 2007/0291696 A1* | 12/2007 | Zhang et al. | .................. | 370/331 |
| 2008/0310561 A1* | 12/2008 | Song et al. | .................... | 375/343 |
| 2009/0073944 A1* | 3/2009 | Jiang et al. | .................... | 370/338 |
| 2010/0002573 A1* | 1/2010 | Baldemair et al. | ............ | 370/210 |
| 2010/0220664 A1* | 9/2010 | Hooli et al. | ................... | 370/329 |
| 2011/0165874 A1* | 7/2011 | Amirijoo et al. | ............. | 455/434 |

FOREIGN PATENT DOCUMENTS

EP 1681821 7/2006

OTHER PUBLICATIONS

Zhou et al. "An efficient random access scheme for OFDMA systems with implicit message transmission"; IEEE transactions on wireless communications, vol. 7;No. 7 Jul. 2008 pp. 2790-2797.*

(Continued)

*Primary Examiner* — David Ometz
*Assistant Examiner* — Rahel Guarino
(74) *Attorney, Agent, or Firm* — D. Scott Juneau

(57) ABSTRACT

Certain embodiments of the present disclosure allow for detection of a transmitted preamble sequence by processing a correlation of a received signal and a preamble hypothesis in a way that exploits the good correlation properties of the known set of preamble sequences. For certain embodiments, the highest peaks of the correlation output may be compared across all preamble hypotheses to decide which preamble sequence is transmitted.

28 Claims, 18 Drawing Sheets

OTHER PUBLICATIONS

Kun-Chien Hung, Lin, D.W., "Joint Detection of Integral Carrier Frequency Offset and Preamble Index in OFDMA WiMAX Downlink Synchronization," IEEE Wireless Communications and Networking Conference 2007, Mar. 2007, pp: 1959-1964.

Jungwon Lee, J.P. Choi, Hui-Ling Lou, "Joint Maximum Likelihood Estimation of Channel and Preamble Sequence for OFDM Systems," IEEE Global Telecommunications Conference 2007, Nov. 2007, pp: 4145-4149.

A. Dammann, S. Kaiser, "Standard conformable antenna diversity techniques for OFDM and its application to the DVB-T system," IEEE Global Telecommunications Conference 2001, vol. 5, Nov. 2001, pp: 3100-3105.

G. Auer, "Channel estimation for OFDM with cyclic delay diversity," 15th IEEE International Symposium on Personal Indoor and Mobile Radio Communications 2004, vol. 3, Sep. 2004, pp: 1792-1796.

Hyoungsoo Lim, Dong Seung Kwon, "Initial Synchronization for WiBro," 2005 Asia-Pacific Conference on Communications, Oct. 2005, pp: 284-288.

Yang Wen, Wei Huang, Zhongpei Zhang, "CAZAC sequence and its application in LTE random access," IEEE Information Theory Workshop 2006, Oct. 22-26, 2006, pp. 544-547.

NOKIA: "Restricted sets of RACH preamble signatures for environments with high Doppler shifts," R1-070377, 3GPP TSG RAN WG1 #47bis, Sorrento, Italy, (Jan. 15, 2007).

* cited by examiner

METHODS AND SYSTEMS FOR MIMO PREAMBLE DETECTION

CROSS-REFERENCE TO RELATED APPLICATION

This application claims the benefit of priority from U.S. Provisional Patent Application Ser. No. 61/105,000, filed Oct. 13, 2008 and entitled "Methods and systems for MIMO preamble detection with cyclic delay diversity using maximum peaks of correlator output," which is assigned to the assignee of this application and which is fully incorporated herein by reference for all purposes.

TECHNICAL FIELD

The present disclosure generally relates to communication, and more specifically to a method to detect a transmitted preamble sequence during an initial synchronization.

SUMMARY

Certain embodiments of the present disclosure provide a method for detecting a preamble sequence at a receiver in a wireless communication system. The method generally includes receiving cyclically delayed versions of a preamble sequence from a transmitter, correlating the received signal with possible preamble sequence hypotheses to obtain correlation outputs, computing a peak measure for the correlation outputs, the peak measure providing an indication of peak amplitudes for correlation outputs for a given possible preamble sequence, and selecting a preamble sequence corresponding to a correlation output that maximizes the peak measure.

Certain embodiments of the present disclosure provide an apparatus for detecting a preamble sequence at a receiver in a wireless communication system. The apparatus generally includes logic for receiving cyclically delayed versions of a preamble sequence from a transmitter, logic for correlating the received signal with possible preamble sequence hypotheses to obtain correlation outputs, logic for computing a peak measure for the correlation outputs, the peak measure providing an indication of peak amplitudes for correlation outputs for a given possible preamble sequence, and logic for selecting a preamble sequence corresponding to a correlation output that maximizes the peak measure.

Certain embodiments of the present disclosure provide an apparatus for detecting a preamble sequence at a receiver in a wireless communication system. The apparatus generally includes means for receiving cyclically delayed versions of a preamble sequence from a transmitter, means for correlating the received signal with possible preamble sequence hypotheses to obtain correlation outputs, means for computing a peak measure for the correlation outputs, the peak measure providing an indication of peak amplitudes for correlation outputs for a given possible preamble sequence, and means for selecting a preamble sequence corresponding to a correlation output that maximizes the peak measure.

Certain embodiments of the present disclosure provide a computer-program product for detecting a preamble sequence at a receiver in a wireless communication system, comprising a computer readable medium having instructions stored thereon, the instructions being executable by one or more processors. The instructions generally include instructions for receiving cyclically delayed versions of a preamble sequence from a transmitter, instructions for correlating the received signal with possible preamble sequence hypotheses to obtain correlation outputs, instructions for computing a peak measure for the correlation outputs, the peak measure providing an indication of peak amplitudes for correlation outputs for a given possible preamble sequence, and instructions for selecting a preamble sequence corresponding to a correlation output that maximizes the peak measure.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

In an Orthogonal Frequency Division Multiple Access (OFDMA) and Orthogonal Frequency Division Multiplexing (OFDM) cellular systems, the preamble sequence for every sector may be generated from a set of pseudo-random sequences with good auto-correlation and cross-correlation properties. In order to perform an initial synchronization between a mobile station that enters a wireless network and a serving base station (BS), it is required to determine what particular preamble sequence is utilized. However, during the initial synchronization, the MS does not have any knowledge about a wireless channel between the MS and the serving BS.
Exemplary Wireless Communication System The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

Figure 1:
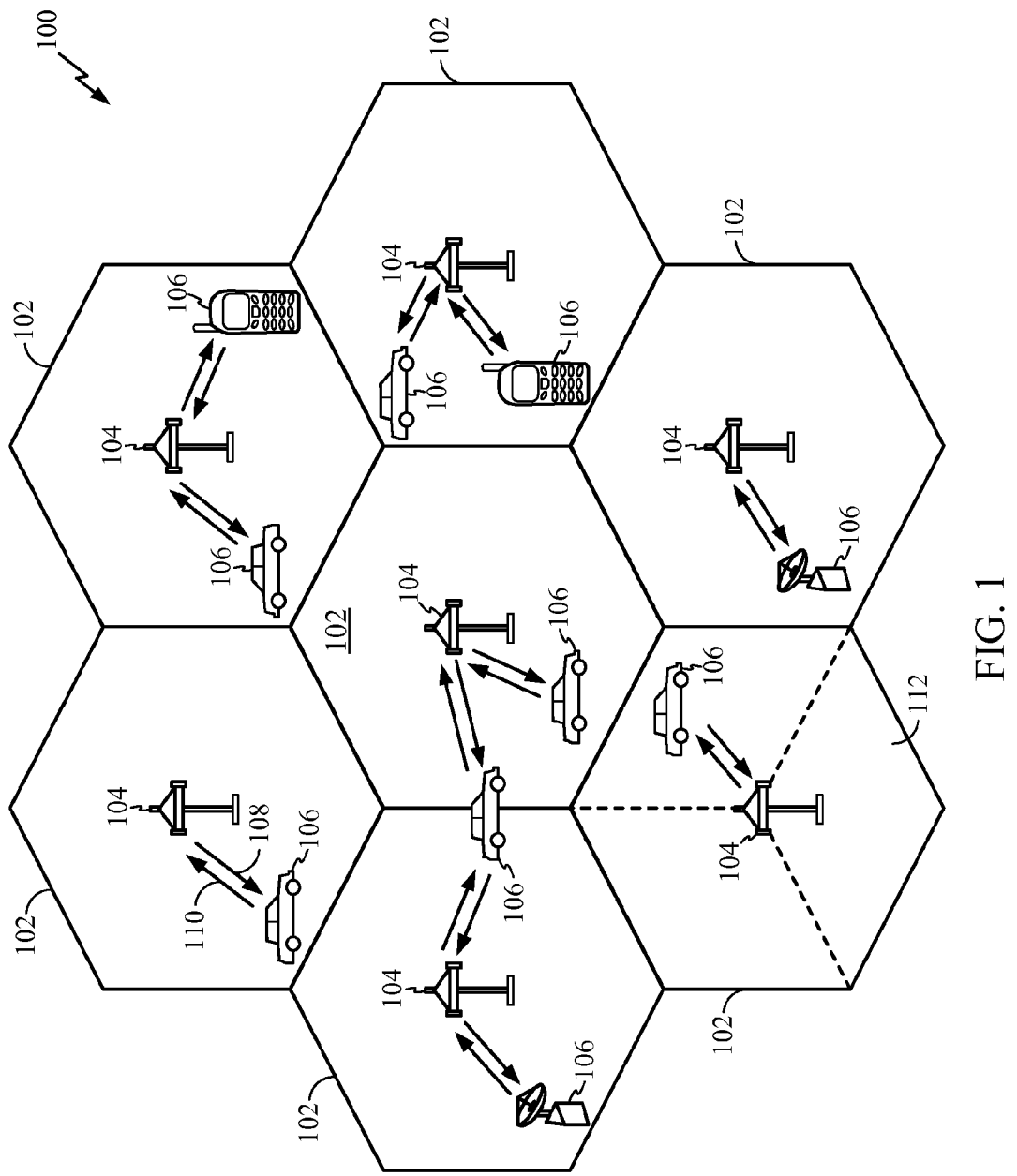
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
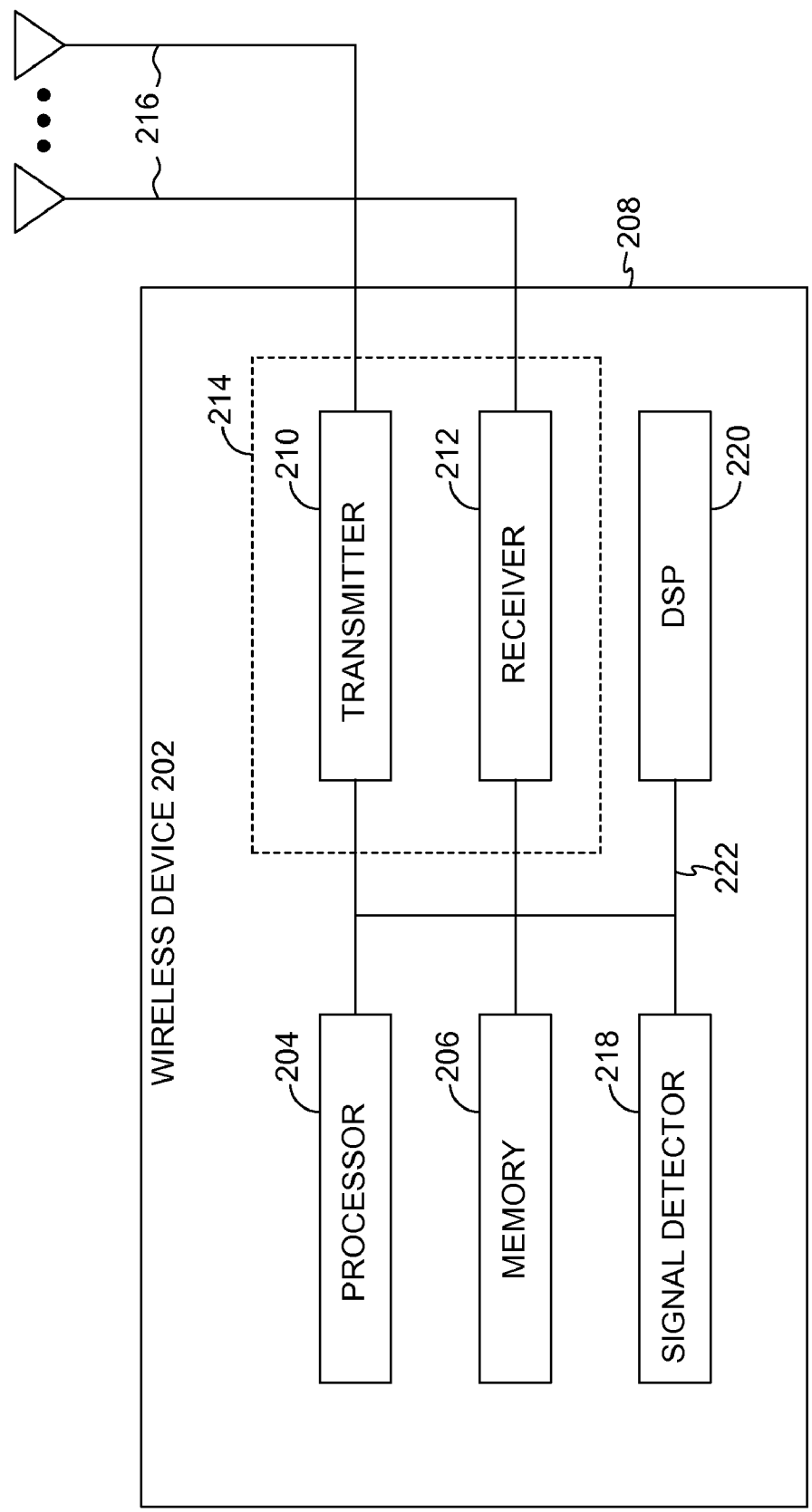
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single, or a plurality of, transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
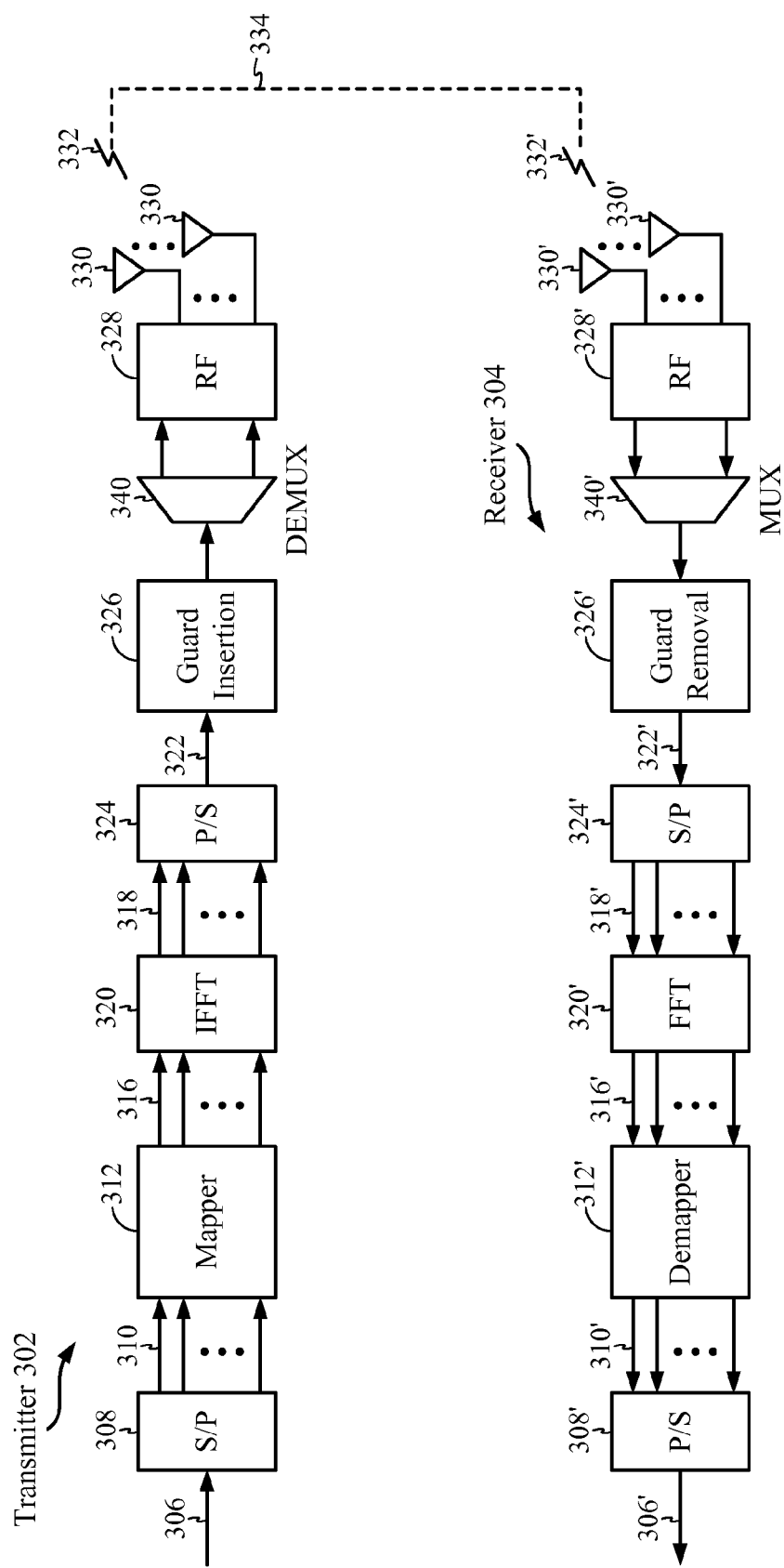
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, Ns, is equal to Ncp (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The signal from the guard insertion component 326 may then be input into demultiplexer 340 to generate different data streams for a plurality of transmit antennas (or equivalently, spatial subchannels). After that, the base-band data stream for each antenna can be upconverted to a desired transmit frequency band by a radio frequency (RF) front end 328, and the antenna array 330 may then transmit the resulting signal 332 across multiple spatial subchannels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial subchannels 334. When a signal 332' is received by the antenna array 330', the received signal 332' may be downconverted to a baseband signal by an RF front end 328' and converted into a single stream by multiplexer 340'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 350'.

Exemplary Wireless System Model

An Orthogonal Frequency Division Multiplexing (OFDM) wireless system may be described in the frequency domain as:

$$Y[k] = \sqrt{E_s}\sqrt{N_{FFT}}H[k]S[k]+N[k], k=1,\ldots,N_{FFT}, \quad (1)$$

where NFFT is the size of Fast Fourier Transform (FFT), which is also equivalent to a size of the Inverse Fast Fourier Transform (IFFT), $E_s$ is a transmission energy per subcarrier, H[k] is a channel coefficient at the kth frequency subcarrier, S[k] is a transmitted preamble tone at the kth frequency subcarrier, Y[k] is a received value at the kth frequency subcarrier, and N[k] is a noise value at the kth frequency subcarrier.

The system model may be also described in a time domain as a correlation between the transmitted preamble sequence and the channel impulse response:

$$y[k] = \sqrt{E_s}s[k] \oplus h[k]+n[k], k=1,\ldots,N_{FFT} \quad (2)$$

Figure 4:
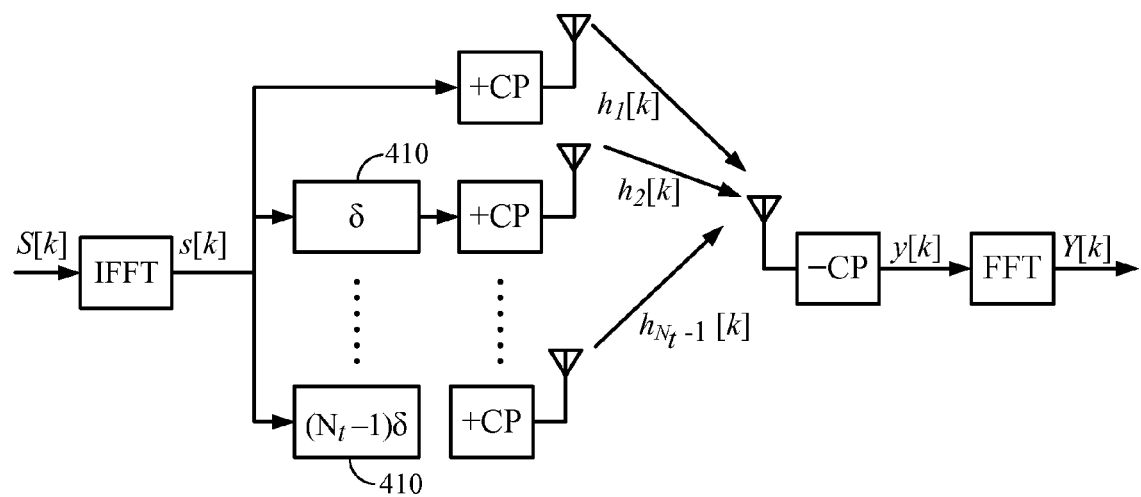
FIG. 4 illustrates an Orthogonal Frequency Division Multiplexing (OFDM) system with Cyclic Delay Diversity (CDD) in accordance with certain embodiments of the present disclosure.

FIG. 4 illustrates an example OFDM system with a Cyclic Delay Diversity (CDD) scheme applied at a transmitter. The time domain signal at the receiver side may be represented as:

$$y[k] = \sqrt{\frac{E_s}{N_t}} \sum_{l=0}^{N_t-1} s[(k-l\delta) \bmod N_{FFT}] \oplus h_l[k] + \eta[k] \quad (3)$$

$$= \sqrt{E_s}\, s[k] \oplus \frac{1}{\sqrt{N_t}} \sum_{l=0}^{N_t-1} h_l[(k-l\delta)\bmod N_{FFT}] + n[k] =$$

$$= \sqrt{E_s}\, s[k] \oplus h_{equ}[k] + n[k],\ k=1,\ldots,N_{FFT}$$

where $\delta$ is a length of cyclic delay for a single transmit antenna.

The equivalent channel impulse response $h_{equ}[k]$ from equation (3) may be given as:

$$h_{equ}[k] = \frac{1}{\sqrt{N_t}} \sum_{l=0}^{N_t-1} h_l[(k-l\delta)\bmod N_{FFT}],\ k=1,\ldots,N_{FFT}. \quad (4)$$

In general, cyclic delays between adjacent transmit antennas may be set to be equal. If the cyclic delay is greater than the length of cyclic prefix (CP) $N_{CP}$, then the channel impulse responses from different transmit antennas may be completely separated and the total number of channel paths may correspond to a sum of channel paths from every individual transmit antenna. NCP represents the minimum value of the cyclic delay for which the channel impulse responses from different transmit antennas may be completely separated. Therefore, the maximum number of transmit antennas whose channel response may be separated is limited by $N_{FFT}/N_{CP}$.

The Cyclic Delay Diversity (CDD) applied at the transmitter may transform a multiple-input single output (MISO) channel into an equivalent single-input single-output (SISO) channel. As illustrated in FIG. 4, the cyclic prefix (CP) may be added after the cyclic delay applied in blocks 410 for each transmit antenna. The cyclic delay δ may be any number, which can be equal or larger than the CP length.

The CDD scheme may transform the spatial diversity at the transmitter into frequency diversity. The increase of frequency selectivity may lead to improved error rate performance of coded OFDM systems. In this case, the receiver may not need to be aware of the a priori information about the number of transmit antennas, the cyclic delay, etc. Cyclic delays may appear at the receiver side as channel multi-paths, thus no special combining is required.

A unified OFDM system model with or without CDD at the transmitter may be represented as:

$$y[k] = \sqrt{E_s} s[k] \oplus h_{equ}[k] + n[k], \quad k=1, \ldots, N_{FFT}. \quad (5)$$

In the time domain, the unified OFDM system model with or without CDD may be represented as:

$$y32 \sqrt{E_s} \text{circulant}(s) \cdot h_{equ} + n = \sqrt{E_s} S \cdot h_{equ} + n, \quad (6)$$

where s is a length-$N_{FFT}$ vector of transmitted preamble signals in time domain, and S=circulant(s) is an $N_{FFT} \times N_{FFT}$ matrix comprising cyclically shifted versions of vector s.

An index of the preamble sequence among multiple preamble sequence hypotheses may be detected. It can be assumed that the OFDM symbol and frame synchronization are already acquired. Also, there may be no frequency offset in the system, channel state information $h_{equ}$ may be unknown at the receiver, and multiple hypotheses for a preamble sequence S may be specified, such as, for example, 38 preamble hypotheses for the WiMAX standard.

The frequency model of the received signal may be represented as:

$$Y[k] = \sqrt{E_s} \sqrt{N_{FFT}} H_{equ}[k] S[k] + N[k], \quad k=1, \ldots, N_{FFT}. \quad (7)$$

The frequency domain matched filter may not work well in this particular case, since the wireless channel is frequency selective, i.e., $H_{equ}[k]$ varies with the frequency index k. If the CDD scheme is applied at the transmitter, the frequency selectivity becomes even more severe and thus the performance of the matched filter in the frequency domain may become worse. Therefore, it may be more convenient to design the preamble detection criterions based on characteristics of the channel impulse response in time domain.

Exemplary Detection of Preamble Sequence

Without considering effects of zero-padding, preamble sequences (in both time and frequency domain) may approximately satisfy Constant Amplitude Zero Auto Correlation (CAZAC) properties:

$$\sum_{n=1}^{N_{FFT}} s_k^*[n] s_l[n-m] = \sum_{n=1}^{N_{FFT}} S_k^*[n] S_l[n-m] \quad (8)$$

$$= \begin{cases} N_{FFT} \delta[m], & k = l \\ \sqrt{N_{FFT}} e^{j\theta}, & k \neq l, \forall m. \end{cases}$$

The CAZAC properties may be represented in the matrix domain as:

$$\text{circulant}(s_k)^H \text{circulant}(s_l) = S_k^H S_l \quad (9)$$

$$= \begin{cases} N_{FFT} \cdot I_{N_{FFT}}, & k = l \\ \sqrt{N_{FFT}} [e^{j\theta_{m,n}}]_{N_{FFT} \times N_{FFT}}, & k \neq l, \end{cases}$$

where $[e^{j\theta_{m,n}}]_{N_{FFT} \times N_{FFT}}$ denotes a matrix whose (m,n)-th element is $e^{j\theta_{m,n}}$.

The correlation output in the time domain may be represented as:

$$corr_k = S_k^H y \quad (10)$$

$$= S_k^H (\sqrt{E_s} S_l h_{equ} + n) =$$

$$= \begin{cases} N_{FFT} \sqrt{E_s} h_{equ} + S_k^H n, & k = l \\ \sqrt{N_{FFT}} [e^{j\theta_{m,n}}]_{N_{FFT} \times N_{FFT}} \sqrt{E_s} h_{equ} + S_k^H n, & k \neq l. \end{cases}$$

It can be observed from equation (10) that if the index is matched at the receiver with that of the transmitted preamble sequence, then the correlation output may be a scaled version of the channel impulse response (plus some noise). If the hypothesis mismatches with the transmitted preamble sequence, then each element of the correlation output may be a linear combination of channel multi-paths with relatively small combination coefficients (with amplitude $\sqrt{N_{FFT}}$).

In general, the number of channel paths may be smaller than $\sqrt{N_{FFT}}$, thus the maximum correlation peak with matched preamble sequence may be always greater than that with unmatched preamble sequence, since:

$$\max(|\sqrt{N_{FFT}} [e^{j\theta_{m,n}}] \cdot h_{equ}|) \leq \quad (11)$$

$$\sqrt{N_{FFT}} N_{mph} \max(|h_{equ}|) \leq N_{FFT} \max(|h_{equ}|),$$

where $N_{mph}$ denotes the number of channel paths.

The conventional preamble detection criterion based on an effort to maximize a total power of the correlation output may be given as:

$$\hat{l} = \arg\max_k \sum_{n=1}^{N_{cp}+(N_t-1)\delta} |corr_k[n]|^2. \quad (12)$$

The summation range of equation (12) may be crucial for accuracy of the preamble detection, and it depends on the power delay profile of the channel impulse response. Since it may be assumed that the maximum channel delay spread can be $N_{CP}+(N_t-1)\delta$, then the summation range may be from 1 to $N_{CP}+(N_t-1)\delta$. If the number of channel multi-paths is smaller than $N_{CP}+(N_t-1)\delta$, then the summation result from equation

(12) may include a large portion of noise terms, which may degrade the detection performance. If the range of delay spread is known to be smaller than $N_{CP}+(N_t-1)\delta$, then the summation range can be narrowed down.

The CDD scheme applied at the transmitter may increase the effective number of channel multi-paths providing more diversity in the system, since it can be assumed that each channel path may fade independently. On the other hand, the CDD scheme may also enlarge the summation range including more noise terms in the summation given by equation (12), which may degrade the detection performance. If a total transmission power is constant, then the energy of each individual channel path may decrease after applying the CDD scheme. Therefore, it may be crucial for the performance of the detection scheme given by equation (12) to achieve good tradeoff between an energy reduction of each individual channel path and the increase of the total number of effective channel paths.

The conventional preamble detection criterion based on the joint maximum likelihood algorithm may be represented as:

$$(\hat{i}, \hat{h}) = \underset{k,\tilde{h}}{\operatorname{argmin}}\|y - \tilde{S}_k \tilde{h}\|^2 \Longleftrightarrow (\hat{i}, \hat{h}) = \underset{k,h}{\operatorname{argmin}}\|y - S_k h\|^2, \quad (13)$$

where $\tilde{h}$ denotes first $N_{CP}+(N_t-1)\delta$ elements of h, and $\tilde{S}_k$ denotes first $N_{CP}+(N_t-1)\delta$ columns of $S_k$.

For each fixed index k, the solution of $\tilde{h}$ that minimizes the mean square error (MSE) may be equal to $(\tilde{S}_k^H \tilde{S}_k)^{-1}\tilde{S}_k^H y$, and the resulting MSE may be equal to $\|y-\tilde{S}_k(\tilde{S}_k^H \tilde{S}_k)^{-1}\tilde{S}_k^H y\|^2$. Thus, the preamble index that solves the minimum mean square error problem may be found as:

$$\hat{i} = \underset{k}{\operatorname{argmin}}\left\|y - \tilde{S}_k (\tilde{S}_k^H \tilde{S}_k)^{-1} \tilde{S}_k^H y\right\|^2. \quad (14)$$

The preamble detection criterion given by equation (14) may require a high computational complexity. Also, it may not be equivalent to the optimum maximum a posteriori (MAP) detector, since the hypothesis (i,h) may not be uniformly distributed. The larger the length of $\tilde{h}$ is, more parameters may need to be estimated, and thus the detection accuracy may be degraded.

There may be several effects of applied CDD scheme on the accuracy of preamble detection for the ML-based technique given by equation (14). The applied CDD scheme may increase the number of channel multi-paths, which may provide a higher level of diversity. On the other hand, more unknown parameters may need to be estimated. This fact may degrade the detection performance given the same number of observations as if the CDD is not applied. If a total transmission power is constant, the energy of each individual channel path may decrease after applying the CDD scheme. Therefore, it may be crucial for the performance of preamble detection given by equation (14) to achieve good tradeoff between an energy reduction of each individual channel path and the increase of the total number of effective paths.

One aspect of a technique for preamble detection proposed herein is to obtain a metric that can quantify the difference in magnitude of correlation outputs between the case where the preamble sequence hypothesis is matched to the transmitted sequence and the case where the hypothesis is not matched to the transmitted sequence. A possible way of distinguishing these two particular cases is by utilizing a metric that computes a ratio of the maximum to the mean of correlation output vector, while considering all preamble sequence hypotheses:

$$f(corr_k) = \frac{\max(|corr_k|^2)}{\operatorname{mean}(|corr_k|^2)}, \quad (15)$$

or approximately:

$$f(corr_k)=\max(|corr_k(1:(N_{CP}+(N_t-1)\delta))|^2). \quad (16)$$

The range for computing the max function in equations (15) and (16) may be $[1, N_{FFT}]$ if the number of transmit antennas $N_t$ is not known or $[1, N_{CP}+(N_t-1)\delta]$ if $N_t$ and the length of cyclic delay $\delta$ are known.

If the information about the number of transmit antennas $N_t$ is known, then another metric can be proposed that computes a sum of a plurality of highest peaks of the correlation output since each transmit antenna may be expected to have at least one strong peak:

$$f(corr_k) = \frac{\sum_{l=1}^{N_t} max_l(|corr_k|^2)}{\operatorname{mean}(|corr_k|^2)}, \quad (17)$$

where $N_t$ from equation (17) is either the number of utilized transmit antennas or the minimum number in the range of possible numbers of transmit antennas if the exact number of transmit antennas is not known at the receiver.

Equation (17) may be approximated as:

$$f(corr_k) = \sum_{l=1}^{N_t} max_l\left(|corr_k(1:(N_{CP}+(N_t-1)\delta))|^2\right), \quad (18)$$

where $max_l(\cdot)$ denotes the lth largest value. The range for computing the max function in equations (17) and (18) may additionally depend on whether or not the cyclic delay is known: the range may be $[1, N_{FFT}]$ if the cyclic delay is not known or $[1, N_{CP}+(N_t-1)\delta]$ if the cyclic delay is known.

The preamble sequence that maximizes the ratio from equation (15) or equation (17) may be found as:

$$\hat{i} = \underset{k}{\operatorname{argmax}} f(corr_k). \quad (19)$$

The preamble detection criterion represented by equations (15)-(19) may exploit correlation properties of preamble sequences. The ratio between the maximum value (or the sum of $N_t$ maximum values) and the mean value of all correlation outputs considering all preamble sequence hypotheses may be a measure of how peaky the correlation output is. The definition based on the sum of the first $N_t$ largest correlation peaks may explore the fact that there may be at least $N_t$ peaks if $N_t$ transmit antennas are employed in the system. The mean value in the denominator is almost the same for all preamble sequences. The searching range for the max function may be narrowed down to the first $N_{CP}+(N_t-1)\delta$ correlation outputs.

There may be several effects of the CDD on the detection performance of the proposed preamble detection technique. The CDD may increase the number of channel multi-paths, which may provide a higher level of diversity. On the other hand, the CDD may enlarge the searching range, which may include more noise terms degrading the detection performance. If a total transmit power is constant, then the energy of each channel path may decrease after the CDD scheme is applied at the transmitter. Therefore, it may be crucial for performance of the proposed preamble detection scheme given by equations (15), (17) and (19) to achieve good tradeoff between energy reduction of each individual channel path and the increase of the total number of effective paths.

Figure 5:
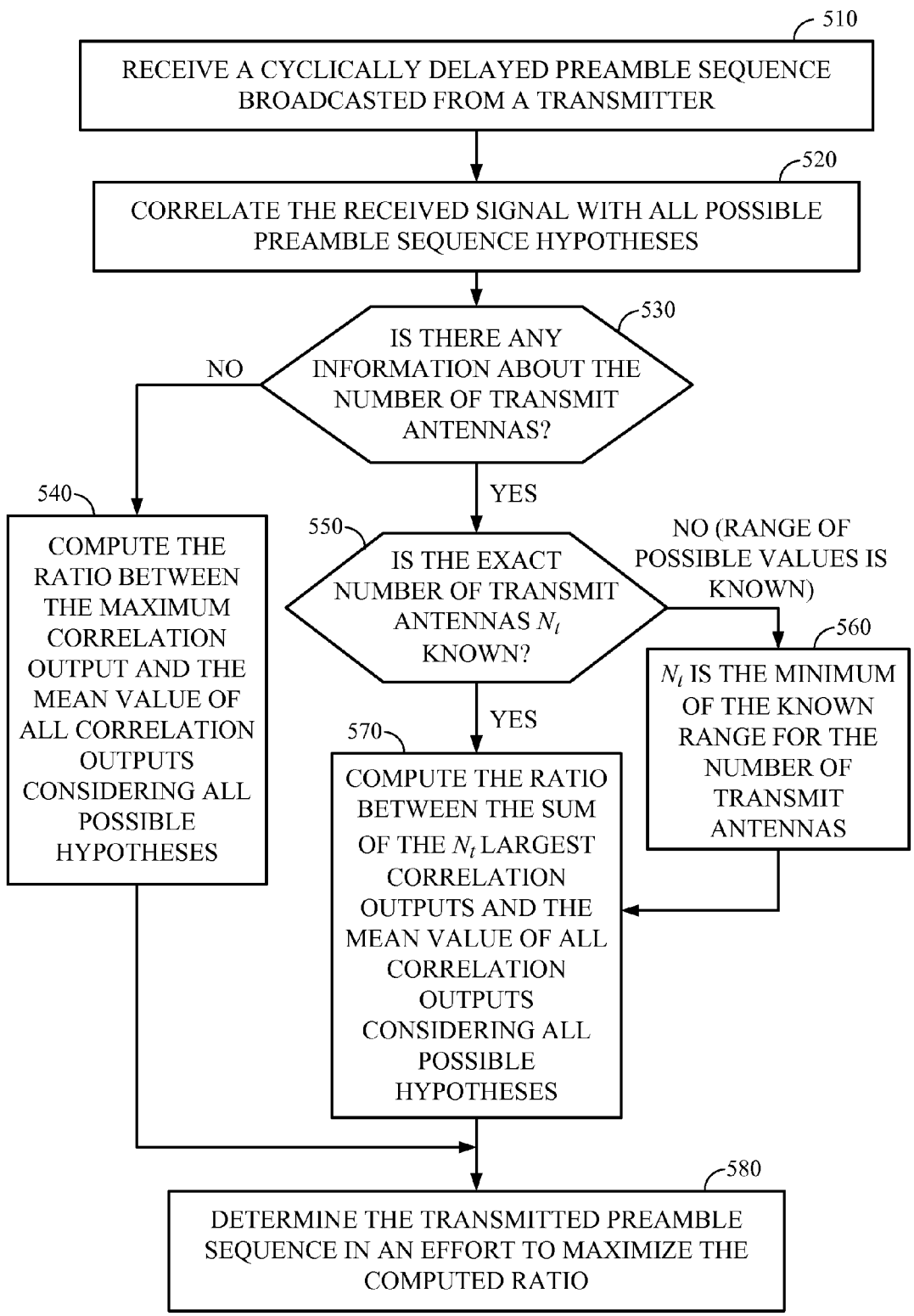
FIG. 5 illustrates a process of detecting a preamble sequence in accordance with certain embodiments of the present disclosure.

FIG. 5 illustrates a process of detecting a preamble sequence using the proposed preamble detection scheme. At 510, a cyclically delayed preamble sequence may be broadcasted from a base station (BS) and received at a mobile station (MS). For example, the BS may generate the cyclically delayed preamble sequence, and the cyclically delayed preamble sequence may be transmitted over a wireless channel from a single or a plurality of transmit antennas. At 520, the receiver (mobile station) may correlate the received signal with all possible preamble sequence hypotheses.

If the receiver does not have any information about the number of transmit antennas (decision step 530), then the ratio between the maximum correlation output and the mean of all correlation outputs considering all possible preamble hypotheses may be computed according to equation (15), at 540. At 580, the preamble sequence may be determined in an effort to maximize the computed ratio, as given by equation (19).

On the other hand, if the exact number of utilized transmit antennas $N_t$ is known at the receiver (decision steps 530 and 550), then the ratio between the sum of $N_t$ largest correlation outputs and the mean of all correlation outputs may be computed according to equation (17), at 570. If the exact number of utilized transmit antennas $N_t$ is not known at the receiver but only the range of possible values (decision step 550), then it can be assumed, at 560, that $N_t$ is actually the minimum number in the range of possible numbers of utilized transmit antennas. For either case, at 580, the preamble sequence may be determined in an effort to maximize the computed ratio from step 570, as given by equation (19).

Exemplary Simulation Results

The proposed preamble detection scheme is evaluated using simulation results in Pedestrian A, Pedestrian B and Vehicular A channels as shown in FIGS. 6-17. The channel bandwidth of 10 MHz may be considered (or oversampled to 11.2 MHz) as specified by the WiMAX standard, the FFT size is 1024 samples, and there are four different preamble sequences that can be transmitted. The number of used subcarriers is 839, the inter-subcarrier spacing is 10.9375 KHz, the number of guard subcarriers is 185, the OFDMA symbol duration is 102.8571 µs, the size of cyclic prefix is 128 chips (⅛ of useful symbol duration, which corresponds to 11.4286 µs), and the size of one frame is 5 ms which corresponds to 48 OFDMA symbols.

Performance of the proposed preamble detection scheme may be first evaluated in slow fading Pedestrian A channel. The delay spread of Pedestrian A channel model is relatively small. There may be only one strong path, so there may be only "one-fold diversity" in this particular channel environment. Therefore, it can be expected that the CDD scheme may significantly improve the accuracy of preamble sequence detection.

Figure 6:
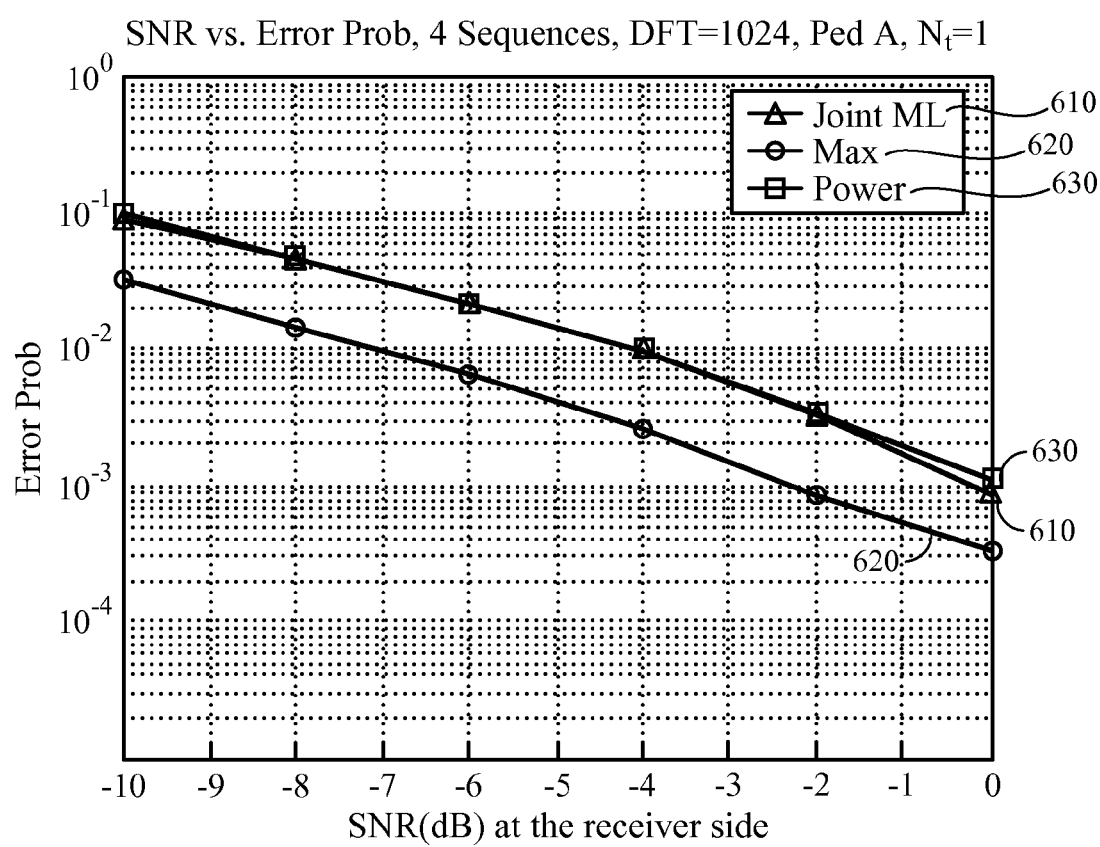
FIG. 6 illustrates an error rate probability of detecting a preamble sequence for different schemes in Pedestrian A channel with one transmit antenna.

FIG. 6 illustrates an error rate probability of detecting a preamble sequence for different schemes in Pedestrian A channel with one transmit antenna in the system. It can be observed that the proposed detection scheme represented with plot 620 outperforms the two conventional detection criterions from the prior art. This is because there is only one strong path in the channel, and the summation range in the scheme based on the total power of correlation outputs given by equation (12) may span from 1 to $N_{CP}$, i.e., most of terms in the summation are noise terms. In addition, there may be $N_{CP}$ unknown parameters to estimate in the joint ML-based algorithm given by equation (14), but only one of these parameters is actually the desired signal, and all other parameters are noise terms.

Figure 7:
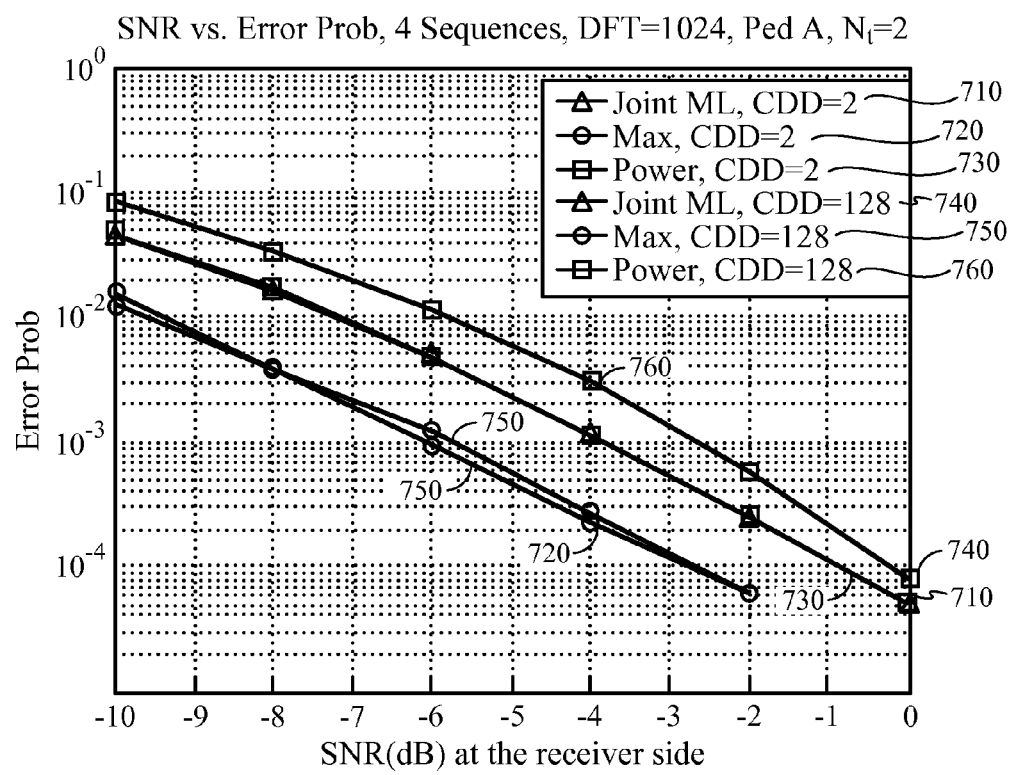
FIG. 7 illustrates the error rate probability of detecting a preamble sequence for different schemes in Pedestrian A channel with two transmit antennas.
Figure 8:
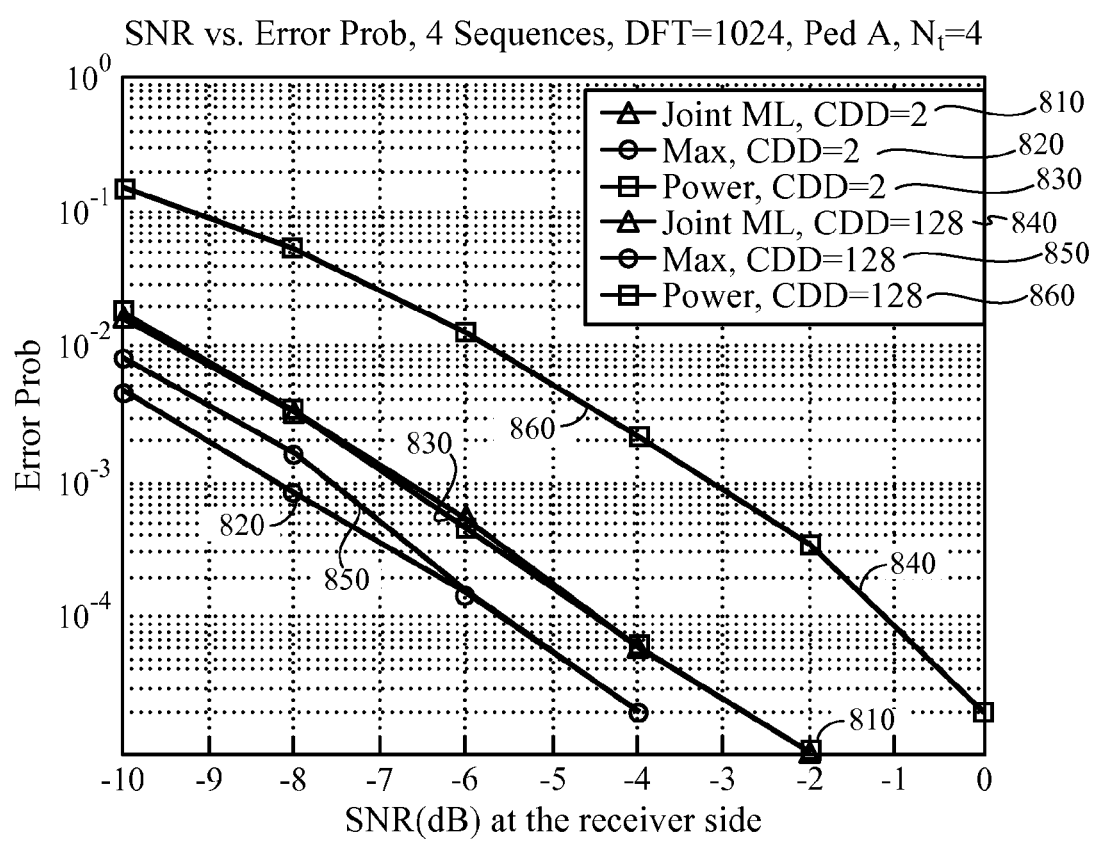
FIG. 8 illustrates the error rate probability of detecting a preamble sequence for different schemes in Pedestrian A channel with four transmit antennas.

FIG. 7 and FIG. 8 show the error rate probability of detecting a transmitted preamble sequence for different schemes in Pedestrian A channel in the case of two and four transmit antennas, respectively. In both cases, the proposed criterion outperforms the two conventional detection schemes (see plots 720 and 820 for the cyclic delay δ of 2 samples). It can be also observed that the detection performance of conventional schemes strongly depend the length of cyclic delay, while performance of the proposed algorithm may be less sensitive.

Figure 9:
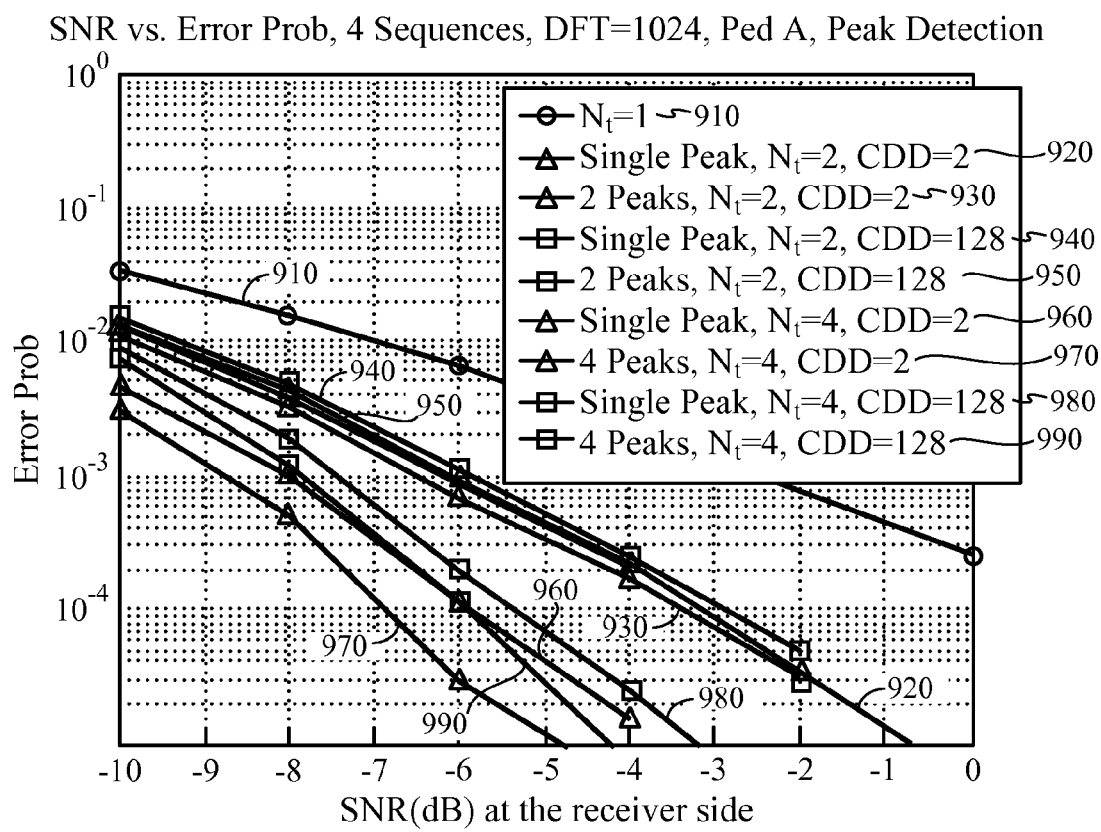
FIG. 9 illustrates the error rate probability of detecting a preamble sequence for different schemes in Pedestrian A channel based on various numbers of correlation peaks.

FIG. 9 illustrates the error rate probability of detecting the transmitted preamble sequence for different schemes based on various numbers of correlation peaks in Pedestrian A channel. It can be observed that the detection technique based on multiple peaks may outperform the detection based on a single peak. This is because if the CDD scheme is applied in the system with $N_t$ transmit antennas, there may be at least $N_t$ correlation peaks. It can be also observed from FIG. 9 that the detection performance may not be substantially sensitive to CDD parameters (i.e., the length of cyclic delay and the number of correlation peaks) in the case of two transmit antennas. If the cyclic delay is equal to the length of the CP, then the channel impulse responses from different transmit antennas can be fully separated.

Performance of the proposed preamble detection scheme may be also evaluated in Pedestrian B channels. The maximum delay of Pedestrian B channel model is 3.7 µs, and there may be more than one strong path. Therefore, this particular channel may already be more diversified compared to Pedestrian A channel.

Figure 10:
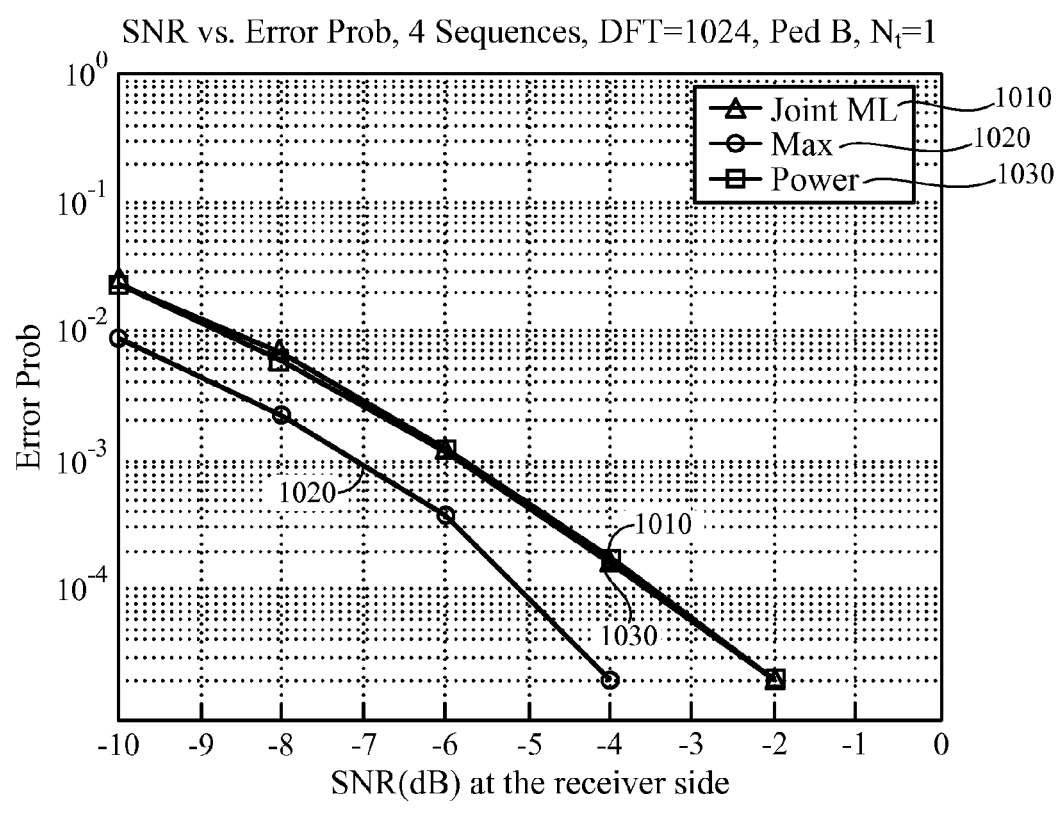
FIG. 10 illustrates the error rate probability of detecting a preamble sequence for different schemes in Pedestrian B channel with one transmit antenna.

FIG. 10 illustrates the error rate probability of detecting a transmitted preamble sequence for different schemes in Pedestrian B channel with one transmit antenna in the system. It can be observed that the proposed preamble detection technique represented with plot 1020 may outperform the two conventional detection criterions. This is because, in the scheme given by equation (12) based on the total power of correlation outputs, only a few (i.e., much smaller than $N_{CP}$) channel paths are actually signals, but the summation range is from 1 to $N_{CP}$, i.e., most of terms in the summation may be noise terms. In addition, there may be $N_{CP}$ unknown parameters to be estimated in the joint ML algorithm given by equation (14), but only one of these parameters is actually the desired signal, and all others parameters are noise terms.

Figure 11:
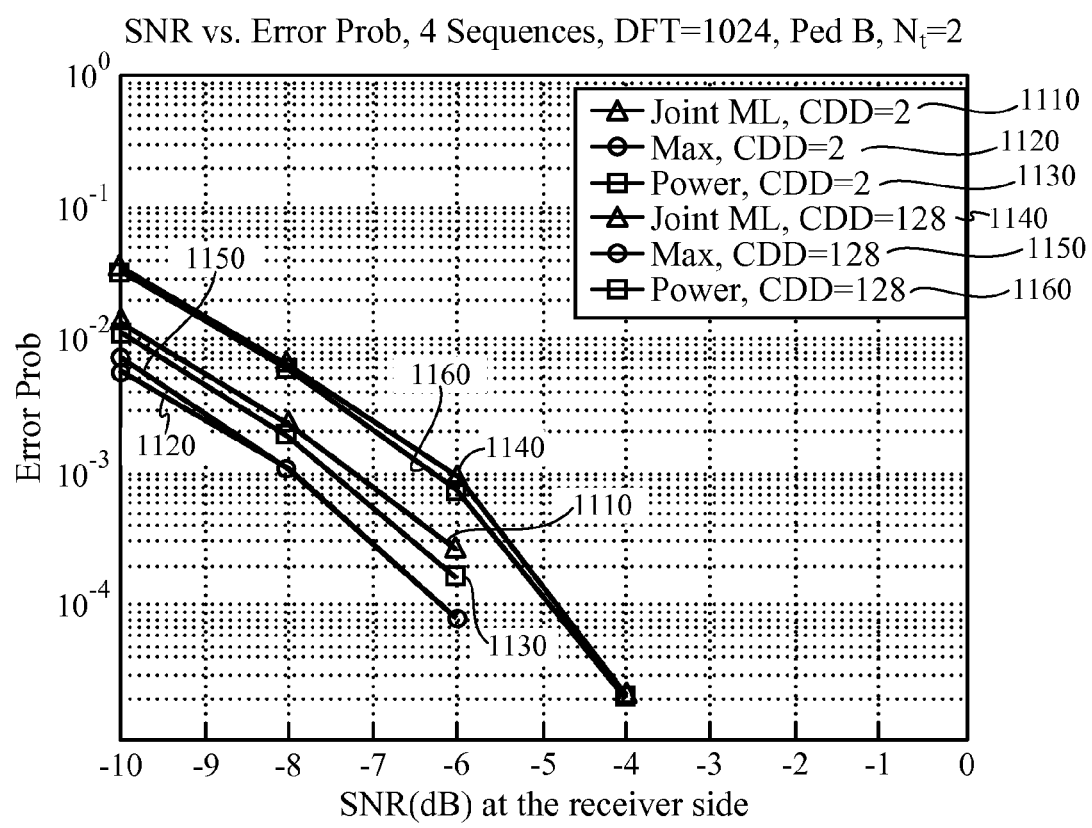
FIG. 11 illustrates the error rate probability of detecting a preamble sequence for different schemes in Pedestrian B channel with two transmit antennas.
Figure 12:
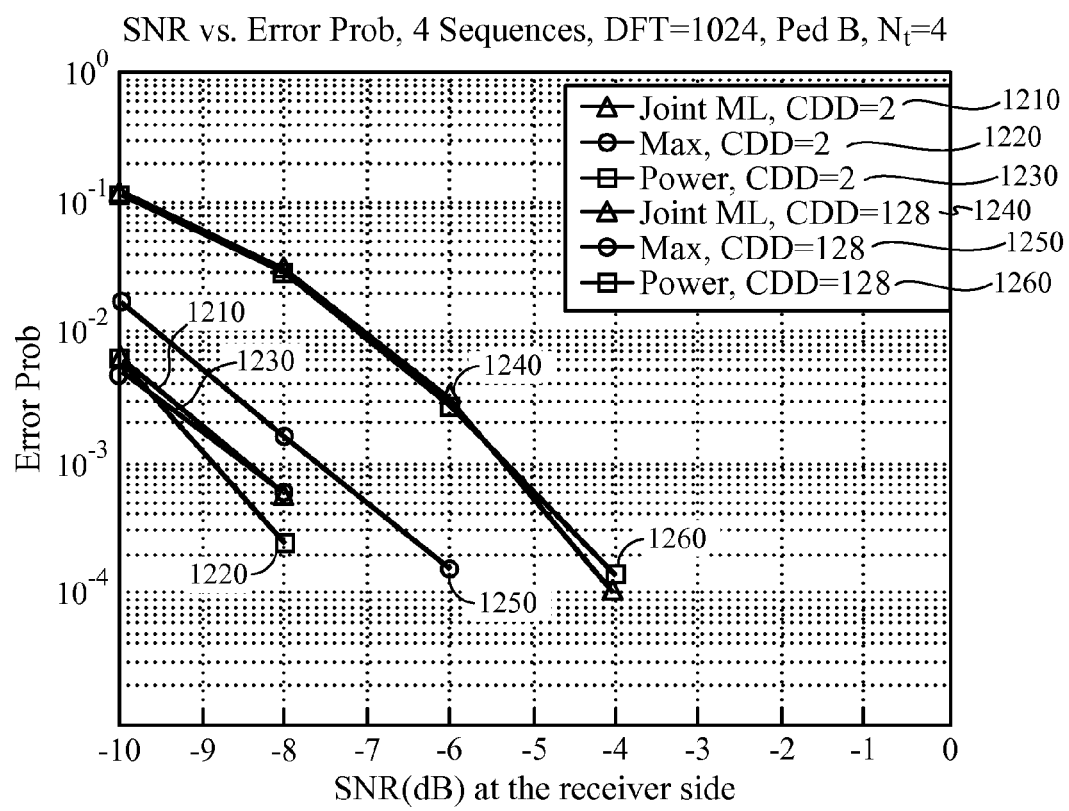
FIG. 12 illustrates the error rate probability of detecting a preamble sequence for different schemes in Pedestrian B channel with four transmit antennas.

FIG. 11 and FIG. 12 show the error rate probability of detecting the transmitted preamble sequence for different schemes in Pedestrian B channel with two and four transmit antennas, respectively. In both cases, the proposed preamble detection scheme may outperform the two conventional detection criterions (see plots 1120 and 1220 for the cyclic delay δ equal to 2 samples). It can be observed that detection performance of conventional techniques may strongly depend on the length of cyclic delay, while the performance of the proposed detection scheme may be less sensitive.

Figure 13:
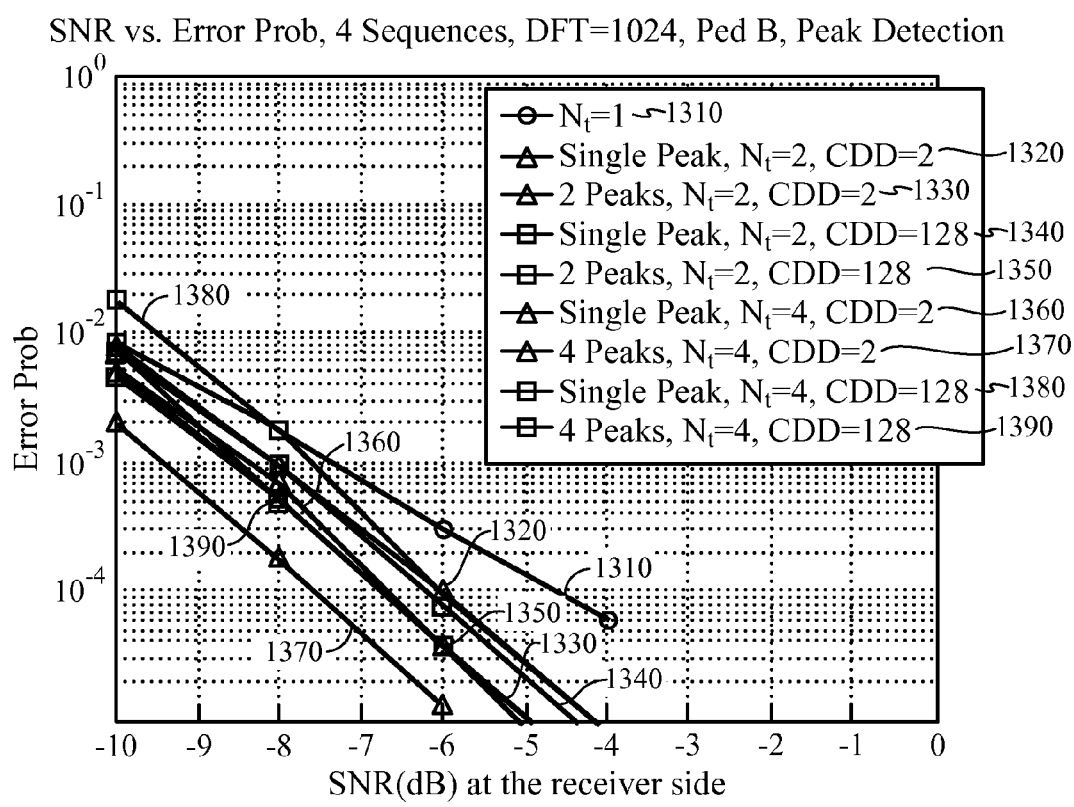
FIG. 13 illustrates the error rate probability of detecting a preamble sequence for different schemes in Pedestrian B channel based on various numbers of correlation peaks.

FIG. 13 illustrates the error rate probability of detecting a preamble sequence based on various numbers of correlation peaks for different schemes in Pedestrian B channel. It can be observed that the detection approach based on multiple peaks may outperform the rule based on a single peak. This may be because if the CDD scheme is applied in the system with $N_t$ transmit antennas, there may be at least $N_t$ correlation peaks.

It can be also noticed from FIG. 13 that the detection performance may be improved in the SNR regime greater than −10 dB for larger number of transmit antennas. In the case of two transmit antennas, the detection performance may not be substantially sensitive to CDD parameters (i.e. the length of cyclic delay and the number of correlation peaks). Although in some cases the performance may not be sensitive to CDD parameters, the smaller the duration of cyclic delay δ is, the better the detection performance are. However, with the large cyclic delay δ, e.g., δ=$N_{CP}$ the channel states from each transmit antennas can be separated. On the other hand, larger cyclic delay may correspond to a larger searching range in the correlation output, which may degrade the detection performance. In addition, Pedestrian B channel may have several strong paths, and, therefore, the gain of the CDD technique for the accuracy of preamble detection is not substantial compared to Pedestrian A channel.

Performance of the proposed preamble detection scheme may be also evaluated in fast fading Vehicular A channels. The maximum delay of Vehicular A channel model is 2.5 μs, and there may exist more than one strong path. Therefore, similarly as Pedestrian B channel, Vehicular A channel may be more diversified compared to the Pedestrian A channel.

Figure 14:
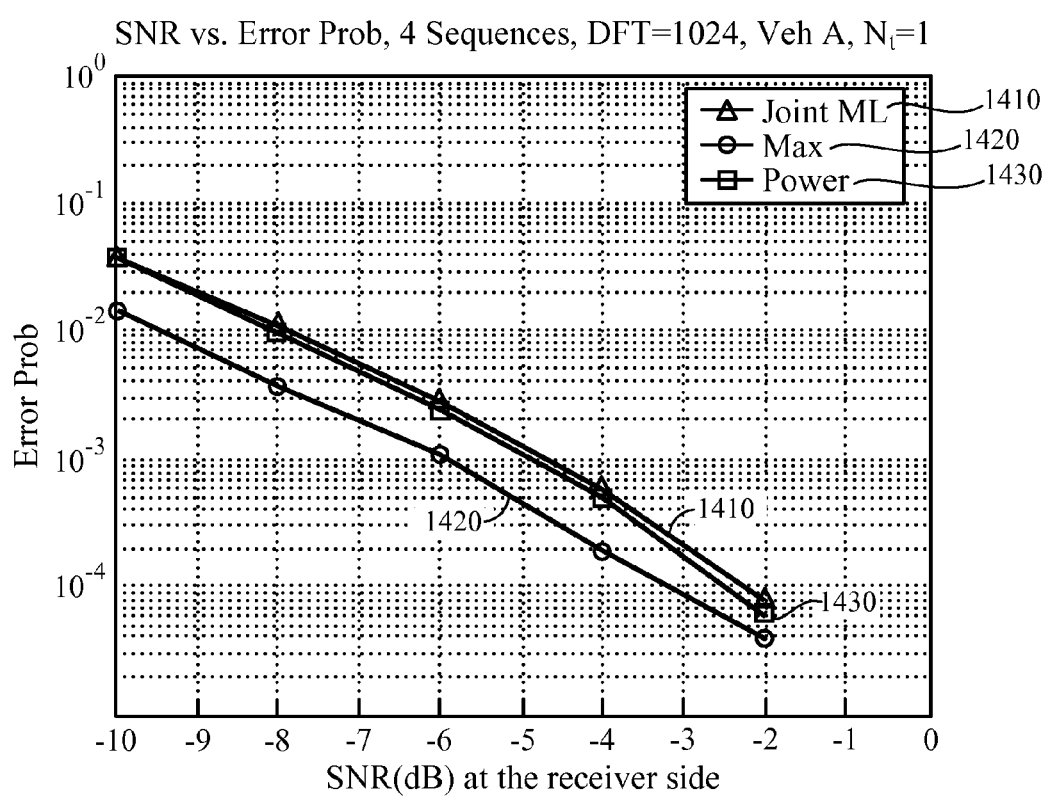
FIG. 14 illustrates the error rate probability of detecting a preamble sequence for different schemes in Vehicular A channel with one transmit antenna.

FIG. 14 illustrates the error rate probability of detecting a transmitted preamble sequence for different schemes in Vehicular A channel in the case of one transmit antenna. It can be observed that the proposed preamble detection scheme represented with plot 1420 may outperform the two conventional detection criterions. This is because, in the scheme given by equation (12) based on the total power of correlation outputs, only a few (i.e., much smaller than $N_{CP}$) channel paths are actually desired signals, but the summation range is from 1 to $N_{CP}$, i.e. most of terms in the summation may be noise terms. In addition, there may be $N_{CP}$ unknown parameters to be estimated in the joint ML algorithm given by equation (14), but only one of these parameters is actually the signal, and all other parameters are noise terms.

Figure 15:
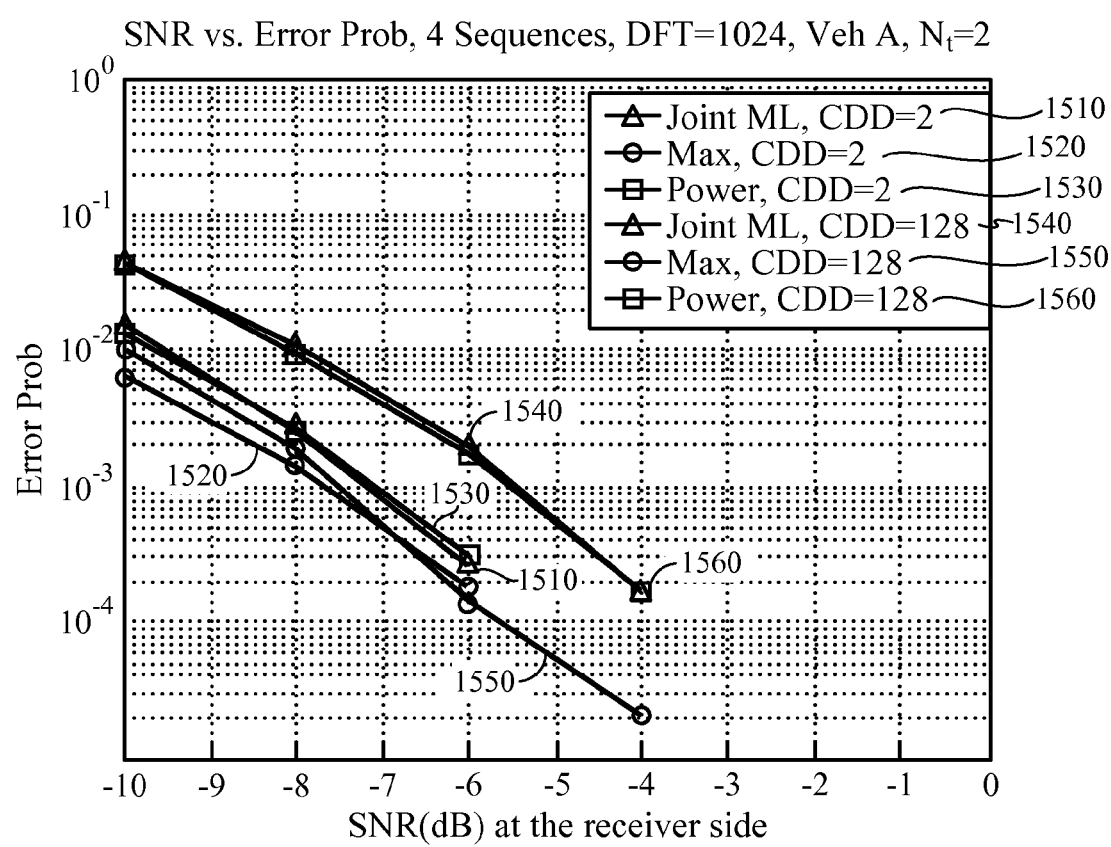
FIG. 15 illustrates the error rate probability of detecting a preamble sequence for different schemes in Vehicular A channel with two transmit antennas.
Figure 16:
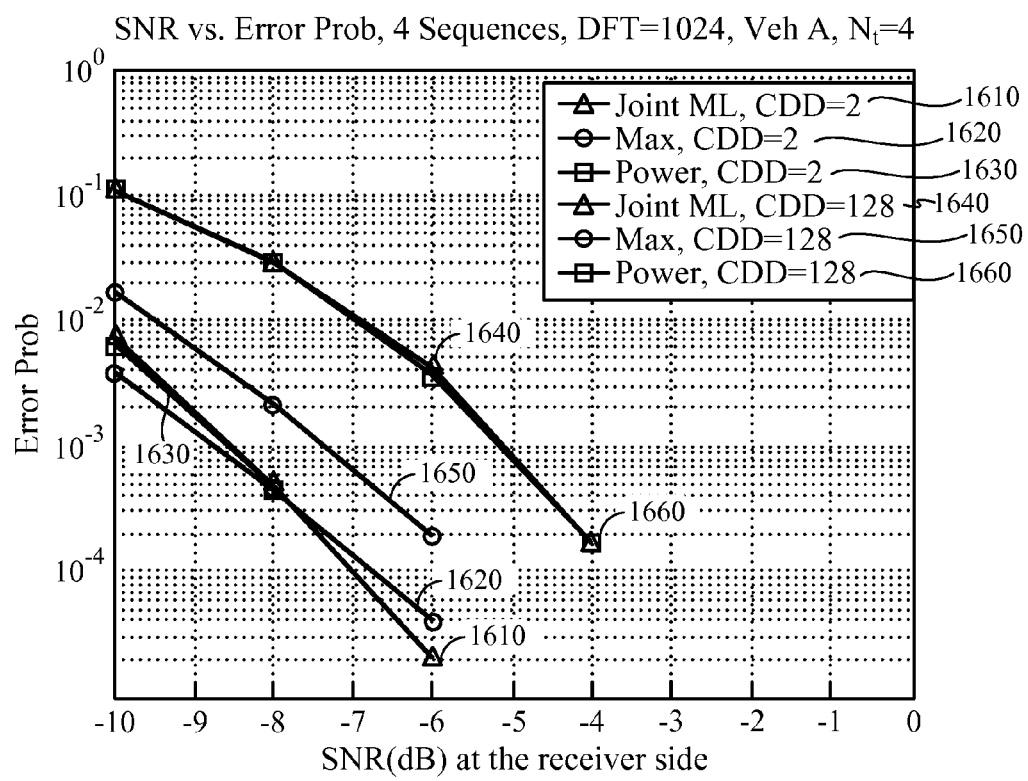
FIG. 16 illustrates the error rate probability of detecting a preamble sequence for different schemes in Vehicular A channel with four transmit antennas.

FIG. 15 and FIG. 16 show the error rate probability of detecting a preamble sequence for different schemes in Vehicular A channel with two and four transmit antennas, respectively. In both cases, the proposed preamble detection scheme may outperform the two conventional detection criterions (see plots 1520 and 1620 for the cyclic delay δ equal to 2 samples). It can be observed that detection performance of two analyzed conventional schemes may depend on the length of cyclic delay while the performance of the proposed preamble detection scheme may be less sensitive.

Figure 17:
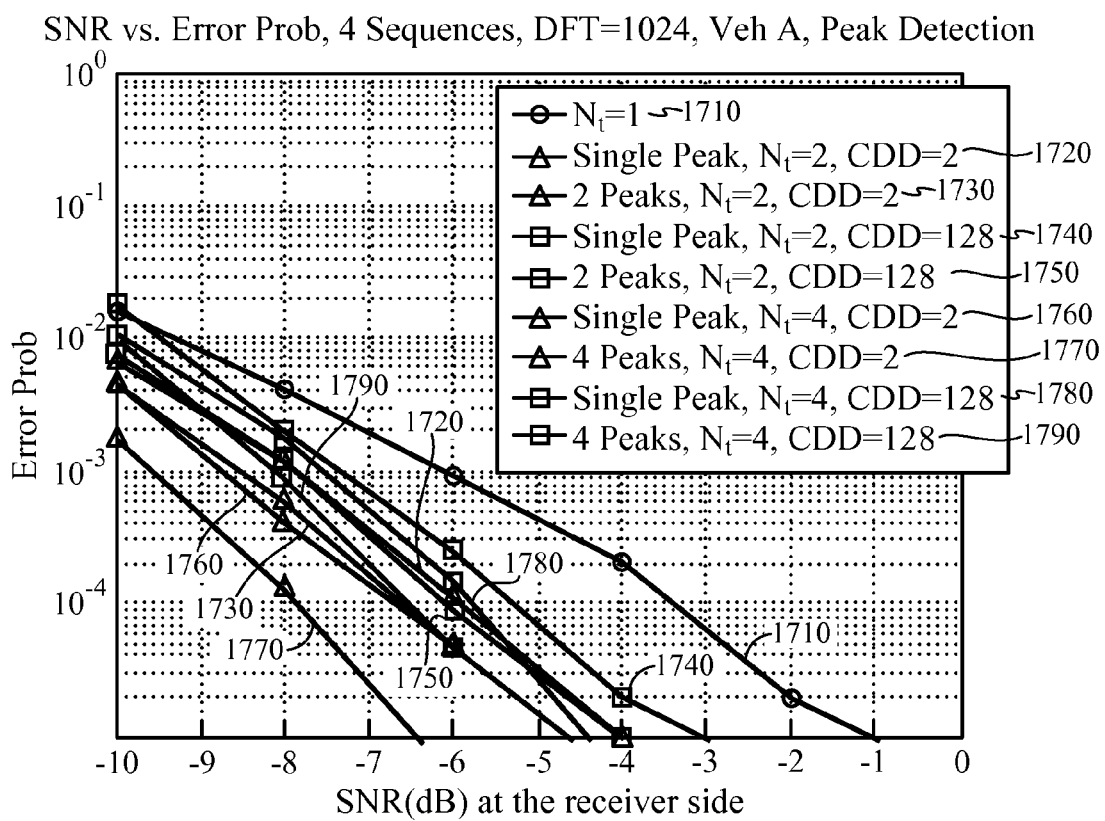
FIG. 17 illustrates the error rate probability of detecting a preamble sequence for different schemes in Vehicular A channel based on various numbers of correlation peaks.

FIG. 17 illustrates the error rate probability of detecting the transmitted preamble sequence based on various numbers of correlation peaks for different schemes in Vehicular A channel. It can be observed that the detection technique based on multiple peaks may outperform the criterion based on a single peak. This is because if the CDD is applied in the system with $N_t$ transmit antennas, there may be at least $N_t$ correlation peaks. It can be observed that the detection performance may improve if the number of transmit antennas is increased.

It can be observed from FIG. 17 that in the case of two transmit antennas, the detection performance may not be substantially sensitive to the CDD parameters (i.e. the length of cyclic delay and the number of correlation peaks). Although in some cases the detection performance may not be sensitive to the parameter δ, the smaller the duration of cyclic delay is, the better the detection performance is. However, if the parameter δ is equal to $N_{CP}$, the channel states from each transmit antennas can be fully separated. On the other hand, a larger cyclic delay may correspond to a larger searching range of the correlation output, which may degrade the detection accuracy. In addition, Vehicular A channel may have several strong paths, and, therefore, the gain of the CDD technique for the accuracy of preamble detection is not substantial compared to Pedestrian A channel.

The proposed preamble detection criterion based on how peaky the correlation output is may outperform schemes from the prior art. Simulation results show performance improvement for the proposed algorithm in a broad range of signal-to-noise ratio (SNR) values. For a system with two transmit antennas, it can be observed that the preamble detection performance of the proposed scheme may not be sensitive to CDD parameters. For a system with four transmit antennas, there is a tradeoff between the length of cyclic delay and the error probability of preamble detection.

Figure 5A:
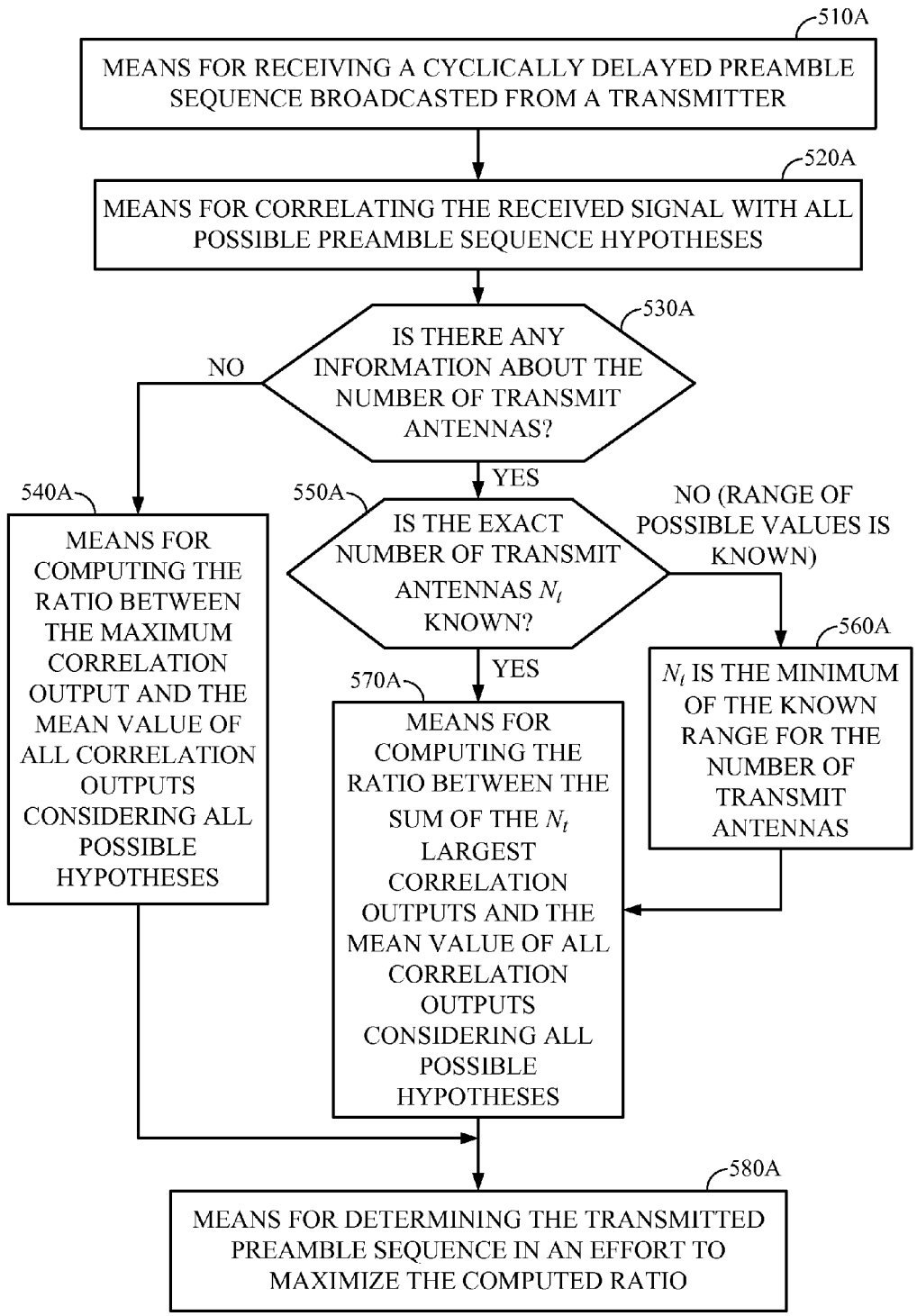
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 510-580 illustrated in FIG. 5 correspond to means-plus-function blocks 510A-580A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for detecting a preamble sequence at a receiver in a wireless communication system, comprising:
   receiving cyclically delayed versions of a preamble sequence from a transmitter having a plurality of transmit antennas, wherein at least a minimum number in a range of possible numbers of transmit antennas is known at the receiver;
   correlating the received signal with possible preamble sequence hypotheses to obtain correlation outputs;
   computing a peak measure for the correlation outputs based on a sum of a plurality of largest correlation outputs corresponding to a possible preamble sequence, the number of largest correlation outputs in the sum being equal to or greater than the minimum number of transmit antennas, the peak measure providing an indication of peak amplitudes for correlation outputs for a given possible preamble sequence; and
   selecting a preamble sequence corresponding to a correlation output that maximizes the peak measure.

2. The method of claim 1, wherein:
   the exact number of transmit antennas utilized, $N_t$, is known at the receiver; and
   computing a peak measure for the correlation outputs comprises summing $N_t$ of the largest correlation outputs corresponding to a possible preamble sequence.

3. The method of claim 1, wherein computing the peak measure comprises:
   computing a ratio between one or more of the correlation outputs and a mean value of the correlation outputs.

4. The method of claim 3, wherein computing a ratio between one or more of the correlation outputs and a mean value of the correlation outputs comprises:
   computing a ratio between a sum of a plurality of largest correlation outputs and a mean value of the correlation outputs.

5. The method of claim 4, wherein:
   the exact number of transmit antennas utilized, $N_t$, is known at the receiver; and
   computing a ratio between one or more of the correlation outputs and a mean value of the correlation outputs comprises computing a ratio between a sum of the $N_t$ largest correlation outputs and a mean value of the correlation outputs.

6. The method of claim 1, wherein the length of cyclic delay is equal or larger than the length of cyclic prefix.

7. The method of claim 1, wherein a wireless channel between the transmitter and receiver comprises one or more strong paths.

8. An apparatus for detecting a preamble sequence at a receiver in a wireless communication system, comprising:
   logic for receiving cyclically delayed versions of a preamble sequence from a transmitter having a plurality of transmit antennas, wherein at least a minimum number in a range of possible numbers of transmit antennas is known at the receiver;
   logic for correlating the received signal with possible preamble sequence hypotheses to obtain correlation outputs;
   logic for computing a peak measure for the correlation outputs based on a sum of a plurality of largest correlation outputs corresponding to a possible preamble sequence, the number of largest correlation outputs in the sum being equal to or greater than the minimum number of transmit antennas, the peak measure providing an indication of peak amplitudes for correlation outputs for a given possible preamble sequence; and
   logic for selecting a preamble sequence corresponding to a correlation output that maximizes the peak measure.

9. The apparatus of claim 8, wherein:
   the exact number of transmit antennas utilized, $N_t$, is known at the receiver; and
   the logic for computing a peak measure for the correlation outputs comprises logic for summing $N_t$ of the largest correlation outputs corresponding to a possible preamble sequence.

10. The apparatus of claim 8, wherein the logic for computing the peak measure comprises:
    logic for computing a ratio between one or more of the correlation outputs and a mean value of the correlation outputs.

11. The apparatus of claim 10, wherein the logic for computing a ratio between one or more of the correlation outputs and a mean value of the correlation outputs comprises:
    logic for computing a ratio between a sum of a plurality of largest correlation outputs and a mean value of the correlation outputs.

12. The apparatus of claim 11, wherein:
    the exact number of transmit antennas utilized, $N_t$, is known at the receiver; and the logic for computing a ratio between one or more of the correlation outputs and a mean value of the correlation outputs comprises logic for computing a ratio between a sum of the $N_t$ largest correlation outputs and a mean value of the correlation outputs.

13. The apparatus of claim 8, wherein the length of cyclic delay is equal or larger than the length of cyclic prefix.

14. The apparatus of claim 8, wherein a wireless channel between the transmitter and receiver comprises one or more strong paths.

15. An apparatus for detecting a preamble sequence at a receiver in a wireless communication system, comprising:
  means for receiving cyclically delayed versions of a preamble sequence from a transmitter having a plurality of transmit antennas, wherein at least a minimum number in a range of possible numbers of transmit antennas is known at the receiver;
  means for correlating the received signal with possible preamble sequence hypotheses to obtain correlation outputs;
  means for computing a peak measure for the correlation outputs based on a sum of a plurality of largest correlation outputs corresponding to a possible preamble sequence, the number of largest correlation outputs in the sum being equal to or greater than the minimum number of transmit antennas, the peak measure providing an indication of peak amplitudes for correlation outputs for a given possible preamble sequence; and
  means for selecting a preamble sequence corresponding to a correlation output that maximizes the peak measure.

16. The apparatus of claim 15, wherein:
  the exact number of transmit antennas utilized, $N_t$, is known at the receiver; and
  the means for computing a peak measure for the correlation outputs means for summing $N_t$ of the largest correlation outputs corresponding to a possible preamble sequence.

17. The apparatus of claim 15, wherein the means for computing the peak measure comprises:
  means for computing a ratio between one or more of the correlation outputs and a mean value of the correlation outputs.

18. The apparatus of claim 17, wherein the means for computing a ratio between one or more of the correlation outputs and a mean value of the correlation outputs comprises:
  means for computing a ratio between a sum of a plurality of largest correlation outputs and a mean value of the correlation outputs.

19. The apparatus of claim 18, wherein:
  the exact number of transmit antennas utilized $N_t$ is known at the receiver; and
  the means for computing a ratio between one or more of the correlation outputs and a mean value of the correlation outputs comprises means for computing a ratio between a sum of the $N_t$ largest correlation outputs and a mean value of the correlation outputs.

20. The apparatus of claim 15, wherein the length of cyclic delay is equal or larger than the length of cyclic prefix.

21. The apparatus of claim 15, wherein a wireless channel between the transmitter and receiver comprises one or more strong paths.

22. A computer-program product for detecting a preamble sequence at a receiver in a wireless communication system, comprising a non-transitory computer readable medium having instructions stored thereon, the instructions being executable by one or more processors and the instructions comprising:
  instructions for receiving cyclically delayed versions of a preamble sequence from a transmitter having a plurality of transmit antennas, wherein at least a minimum number in a range of possible numbers of transmit antennas is known at the receiver;
  instructions for correlating the received signal with possible preamble sequence hypotheses to obtain correlation outputs;
  instructions for computing a peak measure for the correlation outputs based on a sum of a plurality of largest correlation outputs corresponding to a possible preamble sequence, the number of largest correlation outputs in the sum being equal to or greater than the minimum number of transmit antennas, the peak measure providing an indication of peak amplitudes for correlation outputs for a given possible preamble sequence; and
  instructions for selecting a preamble sequence corresponding to a correlation output that maximizes the peak measure.

23. The computer-program product of claim 22, wherein:
  the exact number of transmit antennas utilized, $N_t$, is known at the receiver; and
  the instructions for computing a peak measure for the correlation outputs comprise instructions for summing $N_t$ of the largest correlation outputs corresponding to a possible preamble sequence.

24. The computer-program product of claim 22, wherein the instructions for computing the peak measure comprise:
  instructions for computing a ratio between one or more of the correlation outputs and a mean value of the correlation outputs.

25. The computer-program product of claim 24, wherein the instructions for computing a ratio between one or more of the correlation outputs and a mean value of the correlation outputs comprise:
  instructions for computing a ratio between a sum of a plurality of largest correlation outputs and a mean value of the correlation outputs.

26. The computer-program product of claim 25, wherein:
  the exact number of transmit antennas utilized, $N_t$, is known at the receiver; and
  the instructions for computing a ratio between one or more of the correlation outputs and a mean value of the correlation outputs comprise instructions for computing a ratio between a sum of the $N_t$ largest correlation outputs and a mean value of the correlation outputs.

27. The computer-program product of claim 22, wherein the length of cyclic delay is equal or larger than the length of cyclic prefix.

28. The computer-program product of claim 22, wherein a wireless channel between the transmitter and receiver comprises one or more strong paths.

* * * * *